United States Patent [19]

Semenkoff et al.

[11] Patent Number: 5,502,591
[45] Date of Patent: Mar. 26, 1996

[54] OPTICAL AMPLIFIER WITH A DOPED FLUORIDE GLASS OF OPTICAL FIBRE AND PROCESS FOR PRODUCING SAID AMPLIFIER

[75] Inventors: Mathilde Semenkoff, Perros Guirec; Daniel Ronarc 'H; Marcel Guibert, both of Lannion, all of France

[73] Assignee: France Telecom Etablissement Autonome de Droit Public, Paris, France

[21] Appl. No.: 377,472

[22] Filed: Jan. 24, 1995

[30] Foreign Application Priority Data

Jan. 26, 1994 [FR] France ................... 94 00837

[51] Int. Cl.$^6$ .................................................. H01S 3/00
[52] U.S. Cl. ......................................................... 359/341
[58] Field of Search ........................ 359/341; 372/6

[56] References Cited

U.S. PATENT DOCUMENTS

| | | | |
|---|---|---|---|
| 5,111,334 | 5/1992 | Heidemann | 359/341 |
| 5,115,338 | 5/1992 | Di Giovanni et al. | 359/341 X |
| 5,295,217 | 3/1994 | Marceron et al. | |
| 5,379,148 | 1/1995 | Blondel et al. | 359/341 |
| 5,406,404 | 3/1995 | Di Giovanni et al. | 359/161 |

FOREIGN PATENT DOCUMENTS

| | | |
|---|---|---|
| 0463771 | 1/1992 | European Pat. Off. |
| 0521763 | 1/1993 | European Pat. Off. |
| 2244172 | 11/1991 | United Kingdom. |
| 2243942 | 11/1991 | United Kingdom. |
| 93/09581 | 5/1993 | WIPO. |

OTHER PUBLICATIONS

Electronics Letters, vol. 30, No. 17, Aug. 18, 1994, Enage GB, pps. 1411–1413, M. Semenkoff et al. "High Power, High Gain Optical Fibre Amplifier For Multiwavelength Transmission Systems".

IEEE Photonics Technology Letters —vol. 5, No. 5, May 1993, New York, pp. 540–543, H. Ibrahim et al., "Comparison Between Erbium–Doped Fluoride and Silica Fiber Amplifiers In An AM–CATV Transmission System".

IEEE Photonics Technology Letters—vol. 5, No. 4, Apr. 1993, New York, pp. 401–403, T. Whithley et al., "High Output Power From An Efficient Praseodymium–Doped Fluoride Fiber Amplifier".

IEEE Photonics Technology Letters—vol. 4, No. 9, Sep. 1992, New York, pp. 994–996, M. Yamada et al., "1–dB–gain Pr = Doped Flouride Fieber Amplifier Pumped by High–Power Laser–Diode–Modules".

Primary Examiner—Mark Hellner
Attorney, Agent, or Firm—Pearne, Gordon, McCoy & Granger

[57] ABSTRACT

Optical amplifier with a doped fluoride glass optical fibre and process for the production of said amplifier.

In said amplifier, two monomode silica fibres (4a, 6a), whereof at least one is doped with erbium, are coupled to two ends of an erbium-doped, fluoride glass monomode fibre (2) and have the same optical mode diameter as the latter. Application to optical telecommunications.

13 Claims, 1 Drawing Sheet

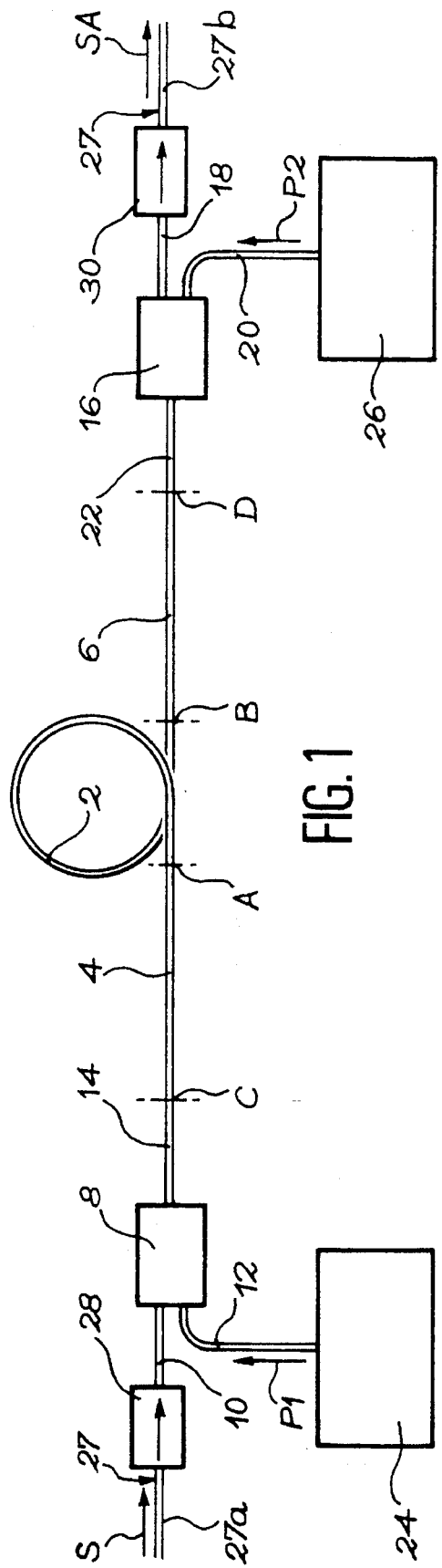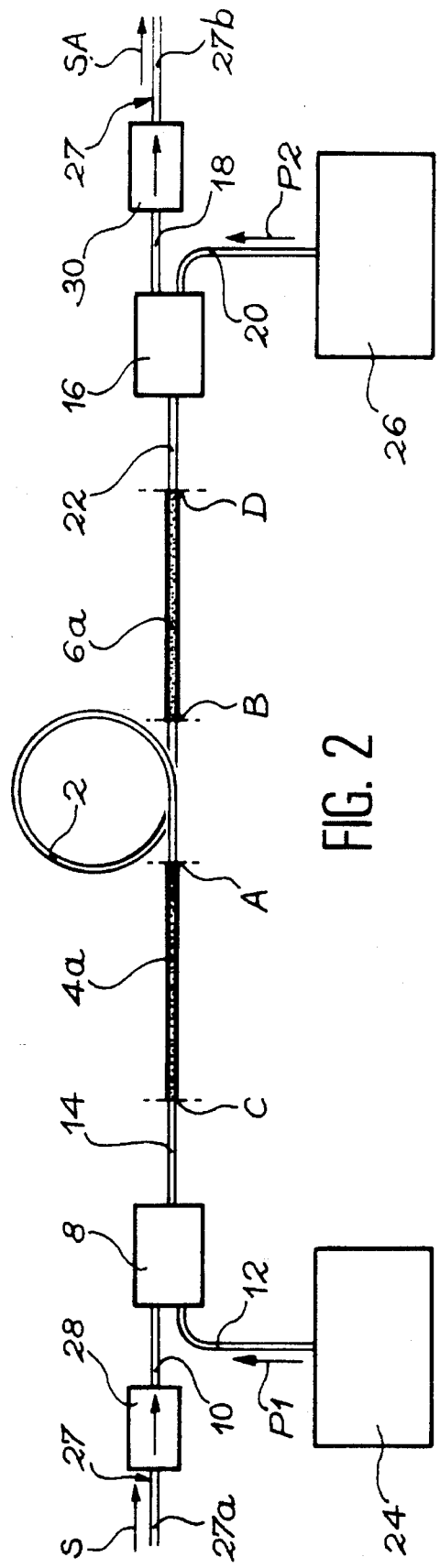

OPTICAL AMPLIFIER WITH A DOPED FLUORIDE GLASS OF OPTICAL FIBRE AND PROCESS FOR PRODUCING SAID AMPLIFIER

BACKGROUND OF THE INVENTION

The present invention relates to an optical amplifier with a doped fluoride glass fibre and a process for the production of said amplifier. It has particular applications in the field of optical fibre telecommunications.

Wavelength multiplexing is a promising method for increasing the transmission capacity of an optical fibre, without its scope being limited by the chromatic dispersion of the fibre, or for giving flexibility to the transmission or distribution network.

The fibre optical amplifier has become a key component of optical telecommunications and the use of a multiplex of wavelengths requires that the optical amplifier has specific performance characteristics. It must be able to amplify the different wavelengths of the multiplex with the same gain, whilst subjecting said wavelengths to an identical noise.

Erbium-doped, silica fibre amplifiers have a non-flat spectral gain and the transmission of a multiplex of wavelengths across an erbium-doped silica fibre amplifier can only take place if the wavelengths are in a flat part of the gain spectrum of said amplifier, which only represents part of the available amplification band of such an amplifier.

Various methods have been proposed for flattening or equalizing the gain spectrum of said erbium-doped, silica fibre optical amplifiers and in particular the use of an optical filter placed in the centre of the amplifying fibre, the use of a fibre laser loop and the use of a not completely pumped fibre.

These methods make it possible to effectively flatten the gain spectrum of said amplifiers, but reduce said gain.

It was established some years ago that by doping with erbium the core of an optical fibre based on fluoride glass, such as a fluorozirconate glass (such as e.g. ZBLAN), the gain spectrum of an amplifier using this type of fibre was naturally flat, i.e. the gain, as a function of the wavelength, was virtually constant in a natural manner for wavelengths close to 1.5 µm, so that such an amplifier is a candidate for multiwavelength transmission.

However, experience acquired with multiwavelength transmission with an erbium-doped, fluoride glass fibre shows that there is a reduction in the gain in that part of the optical spectrum which corresponds to the lower wavelengths, which limits the pass band of the amplifier.

In the centre of the gain spectrum, there is also a reduction of approximately 1.5 dB, which limits the performance characteristics of a "cascade" of erbium-doped, fluoride glass fibre amplifiers. It is therefore necessary to flatten the gain spectrum of erbium-doped, fluoride fibre-based amplifiers.

SUMMARY OF THE INVENTION

The problem of the present invention is to solve this flattening problem.

The invention therefore aims at flattening the gain spectrum of an erbium-doped, fluoride glass optical fibre amplifier.

The invention makes it possible to make the gain of such an amplifier flat to less than 1 dB in the wavelength range from 1533 to 1560 nm, whilst maintaining the gain potential of said amplifier, i.e. without lowering said gain.

For this purpose on either side of the erbium-doped, fluoride glass optical fibre of such an amplifier are placed two silica optical fibres, which are coupled to said doped fluoride glass fibre and whereof at least one is also doped with erbium.

More specifically, the present invention is directed at a fibre optical amplifier comprising a central, monomode optical fibre of erbium-doped fluoride glass and first and second silica, monomode optical fibres respectively placed on either side of said central optical fibre, which have the same optical mode diameter as the latter and which are optically coupled thereto, so that said central optical fibre is able to amplify a light signal reaching it via the first optical fibre, when the central optical fibre receives an optical pumping radiation by means of at least one of the first and second optical fibres, said amplifier being characterized in that at least one of said first and second optical fibres is doped with erbium.

According to a first embodiment of the optical amplifier according to the invention, the first optical fibre is doped with erbium.

According to a second embodiment, the second optical fibre is doped with erbium.

According to a third embodiment, the first and second optical fibres are doped with erbium.

The fluoride glass can be a fluorozirconate glass, such as a glass of the ZBLA or ZBLAN type.

It is also possible to choose any fluoride glass from which a monomode optical fibre can be produced.

The present invention also relates to a process for the production of the optical amplifier also forming the object of the invention, characterized in that the length of the central optical fibre and the length of each erbium-doped, silica optical fibre are chosen and in that then optical coupling takes place between the central optical fibre and the first and second optical fibres, the choice of the lengths of said fibres making it possible to obtain a predetermined shape for the gain curve of the amplifier.

BRIEF DESCRIPTION OF THE DRAWINGS

The invention is described in greater detail hereinafter relative to non-limitative embodiments and the attached drawings, wherein show:

FIG. 1 A diagrammatic view of a known optical amplifier.

FIG. 2 A diagrammatic view of an embodiment of the optical amplifier according to the invention.

DETAILED DESCRIPTION OF THE PREFERRED EMBODIMENTS

The known optical amplifier diagrammatically shown in FIG. 1 comprises an erbium-doped, fluorozirconate glass, monomode optical fibre 2 and a first undoped, silica, monomode optical fibre 4 and a second undoped, silica, monomode optical fibre 6, which are respectively placed on either side of the fibre 2, have the same optical mode diameter as the fibre 2 and are optically coupled thereto.

The ends of the fibre 2, as well as the end of the fibre 4 and the end of the fibre 6, which are to be coupled to said fibre 2, are obliquely polished at between 7° and 12°.

A splicing by adhesion A is performed between the associated ends of the fibres 4 and 2. In the same way, a splicing by adhesion B is performed between the associated ends of the fibres 2 and 6. Thus, a coupling is obtained between the fibres 4 and 2 and also between the fibres 2 and 6.

The amplifier of FIG. 1 also comprises a first multiplexer 8 of the "2 to 1" type provided, on one side, with two standard, silica, monomode optical fibres 10 and 12 and, on the other side, another standard, silica, monomode optical fibre 14 and a second multiplexer 16 of the "2 to 1" type provided, on one side, with two standard, silica, monomode optical fibres 18 and 20 and, on the other side, another standard, silica, monomode optical fibre 22.

The fibres 10, 12, 14, 18, 20 and 22 are e.g. of type G652 (iTU-T).

The fibres 14 and 22 are respectively optically coupled to the free ends of the fibres 4 and 6 by fusion-diffusion welding. The weld between the fibres 4 and 14 carries the reference C and the weld between the fibres 6 and 22 the reference D in FIG. 1.

The free end of the fibre 12 is optically coupled to a first optical pumping laser 24. The free end of the fibre 20 is optically coupled to a second optical pumping laser 26. The lasers 24 and 26 respectively emit optical pumping radiations P1 and P2, which both have a wavelength of 1.48 μm in the embodiment described.

The optical amplifier shown in FIG. 1 is inserted in an optical line constituted by a standard, silica optical fibre 27 in which propagates an optical signal S. This fibre 16 is interrupted for the insertion of the optical amplifier.

Part 27a of the fibre 27 is optically coupled to the fibre 10 by means of a first optical isolator 28 only allowing the passage of light from part 27a to the fibre 10. The other part 27b of the fibre 27 is optically coupled to the fibre 18 by means of a second optical isolator 30 only allowing the passage of light from the fibre 18 to said part 27b.

The radiation P1 reaches the fibre 2 by means of the fibre 12, the multiplexer 8 and the fibres 14 and 4. The radiation P2 reaches the fibre 2 by means of the fibre 20, the multiplexer 16 and the fibre 22 and 6.

The amplifier medium of the fibre 2 is thus optically pumped by the radiations P1 and P2.

The optical signal S successively traverses the isolator 28, the fibre 10, the multiplexer 8, the fibres 14 and 4 and said signal S is amplified in the fibre 2.

The amplified optical signal SA successively traverses the fibres 6 and 22 and the multiplexer 16 and passes out of the amplifier by the fibre 18 and is then propagated in part 27b of the fibre 27 after having traversed the isolator 30.

The optical amplifier according to the invention and which is diagrammatically shown in FIG. 2 is identical to the amplifier of FIG. 1, except that at least one of the fibres 4 and 6 is replaced by an erbium-doped, silica, monomode optical fibre having the same opto-geometrical characteristics as the fibre which it replaces.

In the embodiment shown in FIG. 2 the fibre 4 has been replaced by an erbium-doped, silica, monomode fibre 4a having the same opto-geometrical characteristics as the fibre 4.

The fibre 6 has also been replaced by an erbium-doped, silica, monomode fibre 6a having the same opto-geometrical characteristics as the fibre 6.

However, an optical amplifier according to the invention would also be obtained by only replacing the fibre 4 by the fibre 4a without replacing the fibre 6, or by only replacing fibre 6 by fibre 6a without replacing the fibre 4.

It is pointed out that the opto-geometrical characteristics of an optical fibre are constituted by the diameter of the core of said fibre and by the optical index difference between the core and the optical cladding of said fibre.

It is also pointed out that the optical mode diameter of an optical fibre is calculated for a given wavelength using the opto-geometrical characteristics of said fibre.

In a not shown, optical amplifier according to the invention, the pumping laser 26 is eliminated and the optical fibre 20 then transmits a residual pumping radiation corresponding to the laser 24.

In another not shown, optical amplifier according to the invention, it is the pumping laser 24 which is eliminated (then giving a contradirectional pumping) and the residual pumping radiation (corresponding in this case to the laser 26) is then propagated in the optical fibre 12.

In these two not shown, optical amplifiers according to the invention, only the fibre 4 can be replaced by the corresponding fibre 4a or only the fibre 6 can be replaced by the corresponding fibre 6a, or the fibres 4 and 6 can be respectively replaced by the fibres 4a and 6a.

It is pointed that the exact shape of the gain spectrum (or gain curve), which is the curve of the variations of the gain of the amplifier as a function of the wavelength, is dependent on the length of the erbium-doped, silica fibre or fibres used and the position of said fibre or fibres with respect to the pumping laser or lasers of the amplifier in which same are located.

As has been shown hereinbefore, it is e.g. possible to use a single erbium-doped silica fibre placed on one side of the doped fluorozirconate fibre: either on the side of the pumping laser, or on the side of the output of the optical amplifier (assuming that there is only one pumping laser and that the latter is placed on the side of the input of the amplifier).

When use is made of two erbium-doped, silica, monomode fibres, respectively placed on either side of the doped fluorozirconate, monomode fibre (with one or two pumping lasers), said two erbium-doped, silica, monomode fibres do not necessarily have the same length.

It is pointed out that when use is made of two pumping lasers for a codirectional pumping and a contradirectional pumping, when there is only a single doped silica fibre, the laser located on the side thereof can be a laser emitting at 0.98 μm, and when there are two doped silica fibres, one of the two lasers can be a laser emitting at 0.98 μm.

The shape of the gain spectrum of an optical amplifier according to the invention is dependent not only on the length of the erbium-doped, silica fibre or fibres, but also the length of the erbium-doped fluoride glass fibre, said lengths being chosen during the manufacture of said optical amplifier.

Thus, the shape of the gain spectrum can be adjusted by choosing these lengths, on fabricating the amplifier and said choice and said fabrication are recommenced until a satisfactory gain spectrum is obtained.

Thus, there is a great flexibility of the engineering of the gain spectrum of the optical amplifier according to the invention and for said amplifier the term "hybrid amplifer" could be used.

We claim:

1. A fibre optical amplifier comprising:
   a central erbium doped, fluoride glass, monomode optical fibre; and first and second silica monomode optical fibres; said central, first, and second fibres having substantially similar optical mode diameters, said central fibre located between said first and second fibres and being optically coupled to said first and second fibres, wherein at least one of said first or second fibres is doped with erbium.

2. Amplifier according to claim 1, wherein the first optical fibre is doped with erbium.

3. Amplifier according to claim 1, wherein the second optical fibre is doped with erbium.

4. Amplifier according to claim 1, wherein the first and second optical fibres are doped with erbium.

5. Amplifier according to claim 1, wherein the fluoride glass is a fluorozirconate glass.

6. A method of producing a fibre optical amplifier comprising the steps of:

providing a first and second silica monomode optical fibre, at least one of said first or second fibres being doped with erbium providing a central erbium doped, fluoride glass, monomode optical fibre, said central fibre being located between said first and second fibres;

optically coupling said central fluoride glass monomode optical fibre to said first and second silica monomode optical fibres; and choosing a suitable length for said first, second and central fibre, said lengths being chosen so that a predetermined gain curve shape is obtained.

7. A method of forming an optical amplifier according to claim 6, wherein the first optical fibre is doped with erbium.

8. A method of forming an optical amplifier according to claim 6, wherein the second optical fibre is doped with erbium.

9. A method of forming an amplifier according to claim 6, wherein the first and second optical fibres are doped with erbium.

10. A method of forming an amplifier according to claim 6, wherein the fluoride glass is a fluorozirconate glass.

11. A method of forming an amplifier according to claim 6, wherein said predetermined gain curve shape is flat in the wavelength range from about 1533 to 1560 nm.

12. A method of forming an amplifier according to claim 11, wherein said flat gain curve is flat within less than 1 dB.

13. Amplifier according to claim 1, wherein in response to receiving optical pumping radiation from said first or second fibres, the central optical fibre amplifies a light signal received from said first optical fibre.

* * * * *